Aug. 29, 1933.    J. E. SANDERS    1,924,658
BRAKE AND MOTOR TESTER
Filed Feb. 26, 1931    2 Sheets-Sheet 1
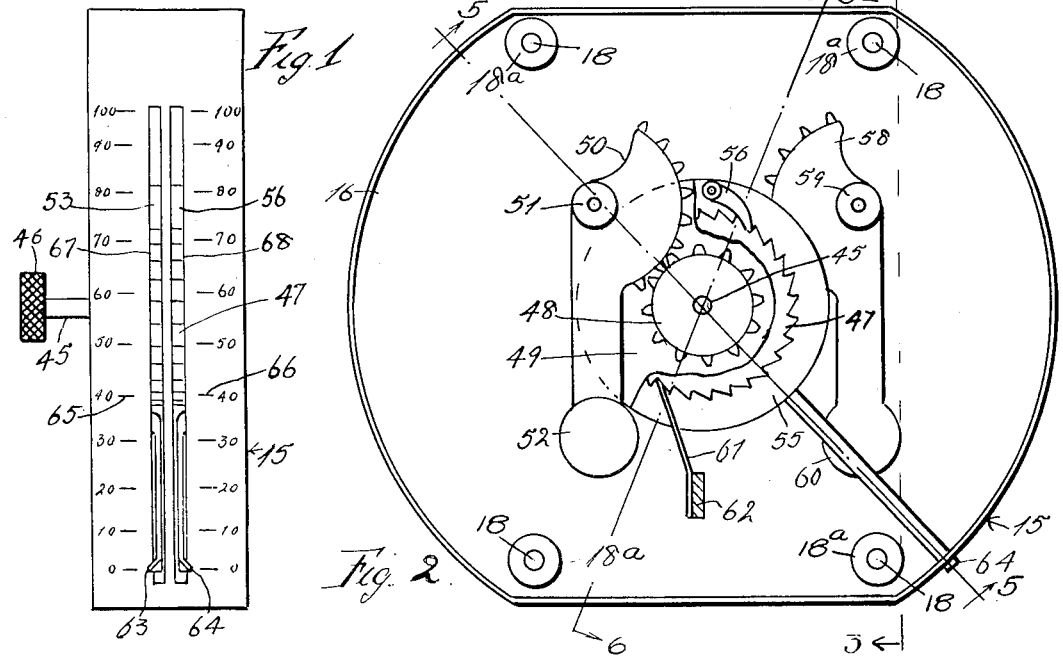
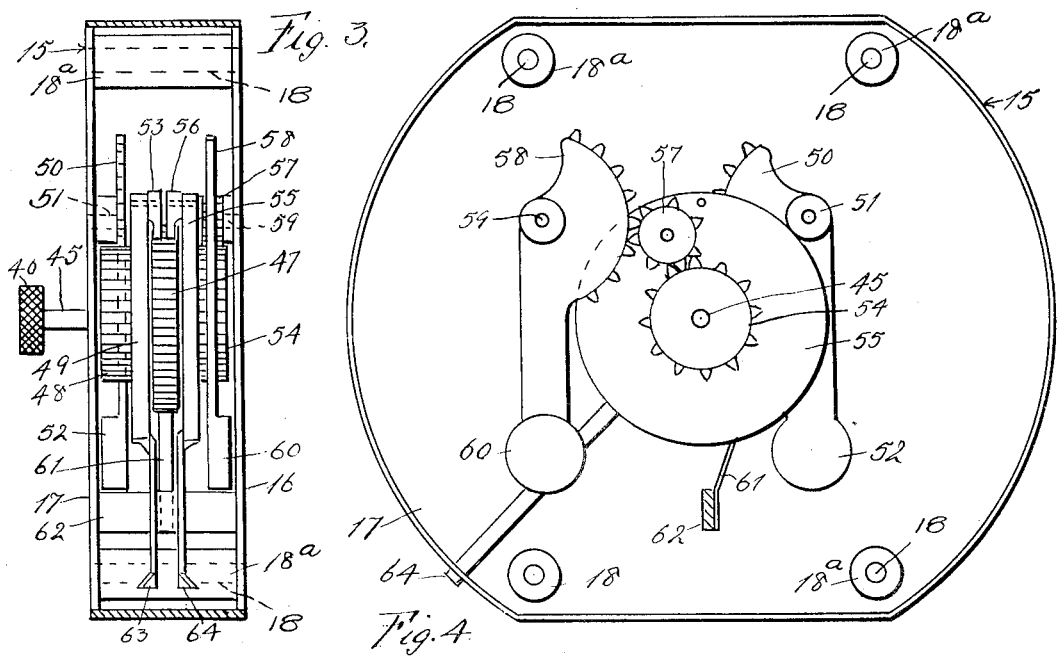
INVENTOR
James E. Sanders
By W. W. Williamson
Atty.

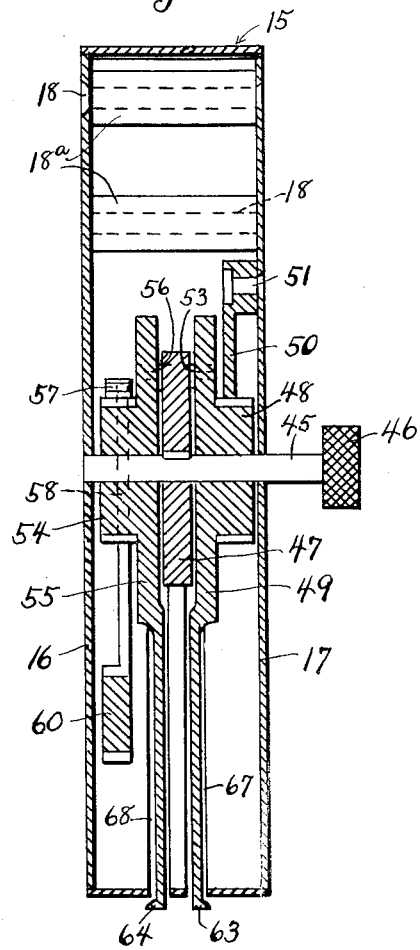
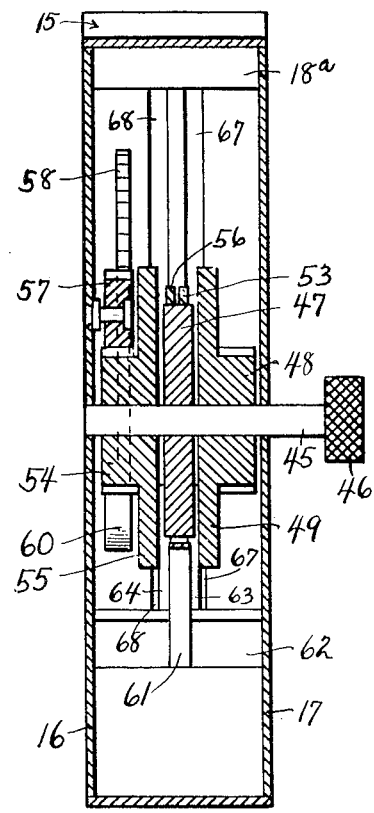

Patented Aug. 29, 1933

1,924,658

UNITED STATES PATENT OFFICE 1,924,658

BRAKE AND MOTOR TESTER

James E. Sanders, Ardmore, Pa., assignor of one-fourth to Guy T. Holcombe

Application February 26, 1931. Serial No. 518,311

2 Claims. (Cl. 264—1)

My invention relates to new and useful improvements in a brake and motor tester, and has for one of its objects to provide an exceedingly simple and effective device of this character which will readily indicate the comparative condition of the motor or brakes or the condition of said motor and brakes and other associated mechanism of a motor vehicle in a comparative manner upon a scale or scales.

Another object of the invention is to utilize the swinging force of a weight or weights, to comparatively indicate the holding condition of brakes and the acceleration of a motor and associated parts of a motor vehicle.

A further object of the invention is to provide a device for testing and giving a comparative reading of the condition of the motor and brakes of a self propelled vehicle in which there are means functioning in opposite directions according to the movements of the vehicle whereby the desired indications are obtained.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a front elevation of a brake and motor tester constructed in accordance with my invention.

Fig. 2 is a view looking toward the side of the device which carries the knob with the near side face plate and the knob removed and a portion of the flange of one of the gears and its associated pointer broken away and a support for the ratchet dog shown in section.

Fig. 3 is a section on the line 3—3 of Fig. 2, with both face plates and the pointers left entirely in elevation.

Fig. 4 is a view looking toward the side of the device opposite the knob and with the then near side face plate removed.

Fig. 5 is a section on the line 5—5 of Fig. 2.

Fig. 6 is a section on the line 6—6 of Fig. 2.

In carrying out my invention as herein embodied 15 represents any suitable frame herein shown as including two face plates 16 and 17 held in spaced relation by suitable fastening devices 18 such as rivets, surrounded by tubular spacers 18a.

In the frame 15 and more particularly in the frame or face plates 16 and 17 is journalled a shaft 45 with a knob 46 thereon whereby said shaft may be rotated when desired and at a suitable location on said shaft 45 between the frame plates is fixed a ratchet 47.

Journalled on said shaft for rotation relative thereto at one side of the ratchet 47 is a pinion 48 which may be provided with a flange 49. A segmental or quadrant gear 50 suitably journalled at 51 meshes with the pinion 48 and carries a pendulum or pendant weight 52 whereby certain actions of the vehicle on which the device is mounted will cause the pendulum or pendant weight to swing in one direction and cause the segmental or quadrant gear 50 to transmit motion to the pinion 48 and its flange 49 and at the end of the movement of the pendulum or pendant weight the parts will be held against return movement by a pawl 53 pivoted to the flange 49 and coacting with the ratchet 47.

Also journalled on the shaft 45 so as to rotate relative thereto is another or duplicate pinion 54 provided with a flange 55 and having a pawl 56 pivoted thereon for coaction with the ratchet 47.

An intermediate gear 57 meshes with the pinion 54 and with said intermediate gear meshes a segmental or quadrant gear 58 suitably journalled at 59 and carrying a pendulum or pendant weight 60 which operatively swings in a direction opposite to the pendulum 52 but because of the intermediate gear 57 motion is transmitted to the pinion 54 so that the latter will revolve or rotate in the same direction as the pinion 48. The ratchet 47 may be held against retrograde movement by a click 61 herein shown as a flat spring having one end fixed to a suitable support 62 and the other or free end coacting directly with the teeth of the ratchet. This click will also provide sufficient friction to prevent accidental rotation of the ratchet during movement of either of the pinions and the subsequent movement of the pawls over the periphery of the ratchet.

The segmental or quadrant gears and their pendulums or pendant weights may be duplicates of each other and therefore are interchangeable and likewise the pinions 48 and 54 may be duplicates of each other and also interchangeable. This might be the preferred form of the invention, although I do not so limit myself, because of the simplicity and relatively lower cost of manufacture and assembly.

The weights or pendulums are moved during acceleration or deceleration due to the inertia of the mass of the weights against the biasing force of gravity and the extent of the movements of the pendulums is a function of the magnitude of the acceleration or deceleration and said movements of the weights 52 and 60 are indicated upon the arbitrary scales 65 and 66 respectively delineated upon the outside of a curved portion of a drum or enclosing wall of the device. Each scale may include a number of divisions, preferably in units of ten and running up to one hundred. The indications are obtained through the medium of the pointers 63 and 64 carried by the pinions 48 and 54 respectively and extending through slots 67 and 68 in the enclosing wall or drum as plainly shown in Fig. 1.

When the pointers are in their neutral or zero positions they contact with the ends of the slots 67 and 68 so that when one pointer is actuated the mechanism connected with the other pointer will be prevented from moving in a retrograde direction.

In mounting the tester upon a vehicle, it is arranged so that the weights or pendulums swing longitudinally of the vehicle or in the direction of straight away travel of said vehicle and as the indicating action of one of the pendulums takes place when swung in one direction and the indicating action of the other pendulum takes place when swung in the opposite direction, one of them will give an indication of the acceleration while the other will give an indication of the deceleration or retardation of the vehicle due to an application of its brakes.

When either of the weights has been moved due to some action of the vehicle on which the device is mounted to cause an indication said weight may be returned to its normal position by rotating the shaft 45 through the medium of the knob 46 which will rotate the ratchet 47 and permit the pendulum to descend until it has reached its normal position and if the other pendulum remains in its normal position the ratchet 47 will merely pass under the pawl associated with the other pendulum whereas if both pendulums have moved the rotation of the shaft 45 will permit the return of both of said pendulums to their normal positions.

Of course, I do not wish to be limited to the exact details of construction herein illustrated and described as these may be varied within the limits of the appended claims without departing from the spirit of my invention.

Having thus fully described my invention, what I claim as new and useful is:—

1. A motor and brake tester for installation in a motor vehicle, comprising normally stationary ratchet means, pointers movable over an arbitrary scale, pawls associated with said pointers and coacting with the ratchet means to hold the pointers in different positions, pinions connected with the pointers, an intermediate gear meshing with one of said pinions, segmental gears, one meshing with a pinion and the other with the intermediate gear, weights carried by said segmental gears for swinging movement in the line of travel of the vehicle and movable by the acceleration or deceleration of the vehicle for transmitting motion to the pointers, and means to permit manual rotation of the ratchet means to return the weights and the pointers to their normal positions.

2. A motor and brake tester for installation in a motor vehicle, comprising a frame including side plates and an enclosing wall, a portion of the latter being curved and having parallel slots therein, arbitrary numerical scales delineated on said enclosing wall adjacent the slots, a shaft journalled in the frame, pinions loosely mounted on the shaft so as to revolve thereon, pointers carried by the pinions and projecting through the slots for coaction with the scales, a segmental gear meshing with one of the pinions to move a pointer over its scale, an intermediate gear meshing with the other pinion, another segmental gear meshing with said intermediate gear to move the other pointer over its scale in the same direction as the first mentioned pointer, weights carried by said segmental gears for swinging movement in the line of travel of the vehicle and normally at rest, one of said weights being set in motion in one direction by acceleration of the vehicle and the other weight being set in motion in the opposite direction by deceleration of the vehicle, a ratchet wheel fixed to the shaft between the pinions, a dog to normally hold said ratchet wheel and the shaft stationary and to prevent retrograde movement thereof, and a pawl carried by each pinion and coacting with the ratchet wheel whereby each pinion and its associated parts may be temporarily held in the position assumed at the end of the swinging movement of its weight and the rotation of said ratchet wheel returning the pinions and their said associated parts to neutral positions.

JAMES E. SANDERS.